Feb. 9, 1932.                P. CROUT                1,844,243
                         MOTOR CONTROLLER
                        Filed March 2, 1931
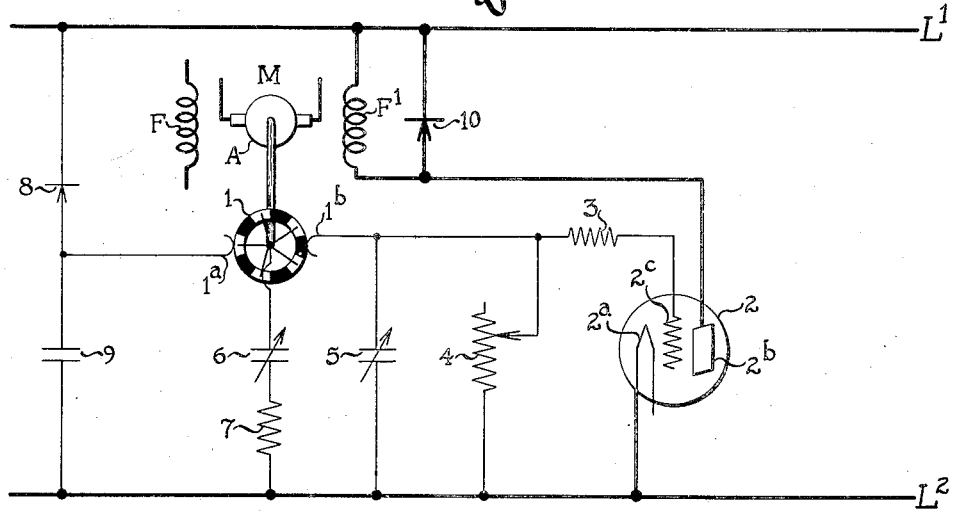
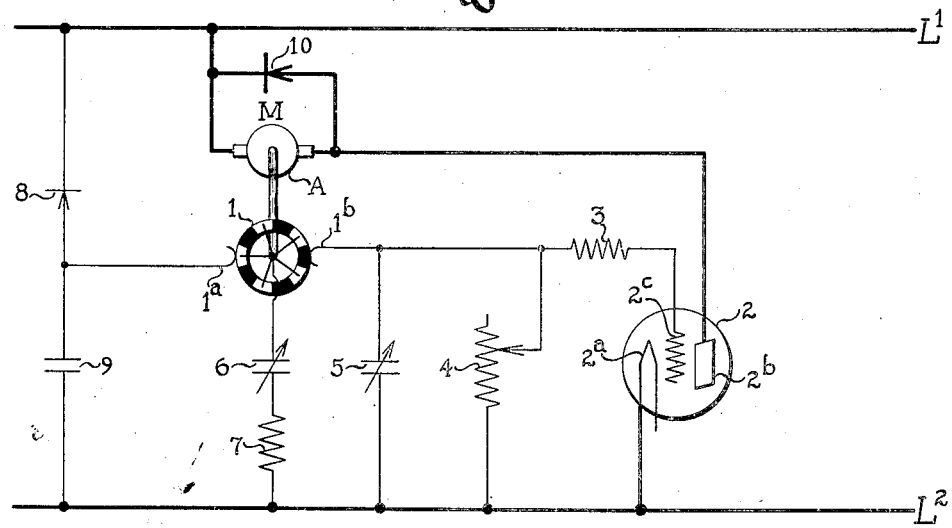
Inventor
Prescott Crout
By Frank H. Hubbard
Attorney Patented Feb. 9, 1932

1,844,243

UNITED STATES PATENT OFFICE

PRESCOTT CROUT, OF SCHENECTADY, NEW YORK, ASSIGNOR TO CUTLER-HAMMER, INC., OF MILWAUKEE, WISCONSIN, A CORPORATION OF DELAWARE

MOTOR CONTROLLER

Application filed March 2, 1931. Serial No. 519,454.

This invention relates to speed controllers for electric motors.

An object of the invention is to provide a controller for the aforementioned purpose which is rapid in response and which controls the speed of the motor within very close limits.

Another object is the use of an electron tube for obtaining the desired results.

Another object is to supply a motor requiring a unidirectional current from an alternating current source through an electron tube.

Another object is to provide a controller whereby the speed of the motor can be easily regulated within a wide range while the speed selected can be kept constant within very narrow limits.

Other objects and advantages will hereinafter appear.

The accompanying drawings are illustrative of certain embodiments of the invention, it being obvious that such embodiments are capable of many modifications, all within the scope of the invention as covered by the description and appended claims.

In the drawings,

Figure 1 illustrates the invention as employed to control the speed of a direct current motor by controlling its field strength, while Fig. 2 illustrates the invention as employed to control the speed of a direct current motor supplied from an alternating current source, by controlling the magnitude of the armature current.

Referring to Fig. 1, a direct current motor M has an armature A and a main field winding F which may be supplied with direct current in any desired manner. The motor is additionally equipped with an auxiliary field winding $F^1$ which is wound in opposition to that of the main field winding F. The lines $L^1$ and $L^2$ of an alternating current supply system furnish power for the excitation of the field $F^1$. Mounted on the shaft of the motor is a rotating commutator 1 having a series of interconnected, spaced segments which make contact with the brushes $1^a$ and $1^b$ in such a manner that when the brush $1^a$ is in contact with a segment, brush $1^b$ is insulated and vice versa. A thermionic tube 2 having a cathode $2^a$ which may be energized in any well known manner, an anode $2^b$ and a grid $2^c$ has its cathode connected to the line $L^2$ and its anode connected to the field $F^1$. In series with the grid $2^c$ is an impedance 3 and an adjustable impedance 4, the other end of which is connected to line $L^2$. In parallel with the impedance 4 is connected an adjustable condenser 5. The junction between the impedance 3 and 4 and the condenser 5 is connected to the brush $1^b$. The segments of the commutator 1 are connected to one side of an adjustable condenser 6 while the other side of the condenser is connected through resistance 7 to the line $L^2$. Between the lines $L^1$ and $L^2$ there is also connected a rectifier 8 of any well known type in series with a condenser 9. The mid-point between rectifier 8 and condenser 9 is connected to the brush $1^a$ so that when an alternating voltage is impressed upon the line $L^1$ and $L^2$, a unidirectional voltage is impressed upon the brush $1^a$. Connected in parallel with the field $F^1$ is a rectifier 10, the purpose of which is to smooth out the fluctuations of the field current through said winding in a well known manner. This rectifier might be replaced by a condenser or any other type of impedance.

The apparatus functions in the following manner:

Assuming that the motor armature and field F are supplied with suitable power and the motor operates, the commutator 1 then revolves. When the brush $1^a$ makes contact with a commutator segment, a voltage is impressed upon the condenser 6 and the resistor 7 and the condenser 6 assumes a definite charge. As the commutator revolves, contact with the brush $1^a$ is broken and contact is made with the brush $1^b$. The condenser 6 thereupon discharges into the condenser 5, thereby imparting to the latter a charge. A negative charge is thus impressed upon the grid $2^c$. As the commutator revolves, additional charges are impressed upon the condenser 5 and the grid $2^c$, while at the same time part of the charge of the condenser 5 leaks off through the impedance 4. When the speed of the motor has reached a certain value, the amount of charge which is transferred from the condenser 6 to condenser 5 is just sufficient to balance the amount of charge leaking off the latter through the impedance 4, so that the grid $2^c$ has an average negative potential which is just sufficient to permit a current to flow through the tube 2 and the field $F^1$ during a fraction of the positive half cycles of the alternating current to maintain the field strength resulting from the field winding F and the field winding $F^1$ at a proper value. If the motor should slow down the negative potential of the grid $2^c$ decreases because the charge leaks off the condenser 5 at a more rapid rate than it is replenished from the condenser 6. As a result, more current can pass through the tube 2 and the winding $F^1$ and as the latter counteracts the winding F, the total field strength of the motor is weakened and the motor speeds up with the result that the strength of the field current $F^1$ is again weakened so as to maintain the speed of the motor at the desired value.

The speed with which the charge of the condenser 5 leaks off and thus the average potential of the grid $2^c$ can be varied by adjusting either the condenser 5 or the impedance 4. It can also be varied by varying the capacity of the condenser 6. It is thus possible to vary the adjustment of the current strength of the field winding $F^1$ within wide limits and thereby adjust the speed of the motor correspondingly.

Referring now to Fig. 2, this shows substantially the same system as Fig. 1 except that in case of Fig. 2, the armature current of the motor is controlled. The motor M may have a field winding supplied in any desired way. The armature A is connected in series with the tube 2 and has connected in parallel with it a rectifier 10 for the purpose aforementioned.

When the motor tends to speed up, the negative potential on the grid $2^c$ is increased in the aforedescribed manner thus decreasing the current which passes through the tube $2^c$ and the armature of the motor and thereby again decreasing the speed of the motor and vice versa.

The tubes employed in this system may be of any well known type such as gaseous thermionic tubes or high vacuum tubes.

It will also be obvious that while the drawings illustrate the employment of half wave rectifying tubes, full wave rectifying tubes or two half wave rectifying tubes may be employed. It is further obvious that instead of impressing a constant charging potential upon the condenser 6, a varying potential may be employed, such potential being varied in accordance with the speed of the motor to be regulated.

What I claim as new and desire to secure by Letters Patent is:

1. In a control system, in combination, a current supply, a translating device, an electron tube for controlling said supply and having a grid, an energy storage circuit connected to said grid, a second energy storage circuit and means adapted periodically to impress upon said second storage circuit a potential the frequency of which varies in accordance with an operating characteristic of the translating device and then discharge said second storage circuit and impress its potential upon said first storage circuit.

2. In a control system, in combination, a current supply, a translating device, a gaseous electron tube for controlling said supply and having a grid, an adjustable energy storage circuit connected to said grid, a second adjustable energy storage circuit and means adapted periodically to impress upon said second storage circuit a potential the frequency of which varies with an operating characteristic of the translating device and then discharge said second storage circuit and impress its potential upon said first storage circuit.

3. In a motor control system, in combination, a current supply, a motor, an electron tube in circuit with said supply and said motor and having a grid, an energy storage circuit connected to said grid, a second energy storage circuit and means adapted periodically to impress upon said second storage circuit a potential the frequency of which varies in accordance with a characteristic of the motor and then discharge said second storage circuit and impress its potential upon said first storage circuit.

4. In a motor control system, in combination, a current supply, a motor, a gaseous electron tube in circuit with said supply and said motor and having a grid, an energy storage circuit connected to said grid, a second energy storage circuit and means adapted periodically to impress upon said second storage circuit a potential the frequency of which varies in accordance with a characteristic of the motor and then discharge said second storage circuit and impress its potential upon said first storage circuit to thereby affect the conductivity of said electron tube.

5. In a motor speed regulating system, in combination, a current supply, a motor, an electron tube in circuit with said motor and said supply and having a grid, an energy storage circuit connected to said grid, a second energy storage circuit and means adapted periodically to impress upon said second storage circuit a potential the frequency of which varies in accordance with the motor speed and then discharge said second storage circuit and impress its potential upon said first storage circuit to thereby affect the conductivity of said electron tube.

6. In a motor speed regulating system, in combination, a current supply, a motor, an electron tube in circuit with said motor and said supply and having a grid, an energy storage circuit connected to said grid, a second energy storage circuit and communicating means whose frequency may be varied in accordance with the motor speed and adapted to impress during alternate half cycles upon said second storage circuit a potential, and during the other half cycle to discharge it and impress its potential upon said first storage circuit to thereby control the current passed by said tube.

7. In a motor speed regulating system, in combination, a current supply, a motor, a gaseous electron tube in circuit with said motor and said supply and having a grid, an energy storage circuit connected to said grid, a second energy storage circuit, and commutating means whose frequency may be varied in accordance with the motor speed and adapted to impress upon said second storage circuit a potential during alternate half cycles and to discharge it and impress its potential upon the first storage circuit during the other half cycles to thereby control the current passed by said tube.

8. In a motor speed regulating system, in combination, a current supply, a motor having a regulating winding, a gaseous electron tube in circuit with said supply and said winding and having a grid, an energy storage circuit connected to said grid, a second energy storage circuit and a commutator connected to the motor shaft and adapted alternately to impress a charge upon the second storage circuit and impress the potential of the second upon the first energy storage circuit to thereby control the current passed by said tube.

9. In a motor speed regulating system, in combination, a current supply, a motor having a regulating winding, a gaseous electron tube in circuit with said supply and said winding and having a grid, an adjustable energy storage circuit connected to said grid, a second energy storage circuit and a commutator connected to the motor shaft and adapted alternately to impress a charge upon the second energy storage circuit and impress the potential of the second upon the first energy storage circuit to thereby control the current passed by said tube.

10. In a motor speed regulating system, in combination, a current supply, a motor having a regulating winding, a gaseous electron tube in circuit with said supply and said winding and having a grid, an adjustable energy storage circuit connected to said grid, a second adjustable energy storage circuit and a commutator connected to the motor shaft and adapted alternately to impress a charge upon the second energy storage circuit and impress the potential of the second upon the first energy storage circuit to thereby control the current passed by said tube.

In witness whereof, I have hereunto subscribed my name.

PRESCOTT CROUT.